United States Patent [19]

Okada et al.

[11] Patent Number: 4,628,359
[45] Date of Patent: Dec. 9, 1986

[54] MEMORY SELECTING SYSTEM FOR SCRAMBLED TELEVISION RECEIVER

[75] Inventors: Takashi Okada, Yokohama; Takao Mogi, Tokyo, both of Japan

[73] Assignee: Sony Corporation, Tokyo, Japan

[21] Appl. No.: 592,257

[22] Filed: Mar. 22, 1984

[30] Foreign Application Priority Data

Mar. 24, 1983 [JP] Japan ................................ 58-49583

[51] Int. Cl.⁴ ........................ H04N 7/167; G11B 5/02
[52] U.S. Cl. .................................. 358/122; 358/121; 358/123; 358/124; 360/27
[58] Field of Search ............... 358/117, 121, 122, 123, 358/124; 360/27

[56] References Cited

U.S. PATENT DOCUMENTS

| | | | |
|---|---|---|---|
| 4,225,884 | 9/1980 | Block et al. | 358/117 |
| 4,278,837 | 7/1981 | Best | 178/22.09 |
| 4,460,922 | 7/1984 | Ensinger et al. | 358/123 |
| 4,514,761 | 4/1985 | Merrell et al. | 358/117 |
| 4,533,949 | 8/1985 | Fujimura et al. | 358/119 |

Primary Examiner—S. C. Buczinski
Attorney, Agent, or Firm—Lewis H. Eslinger; Alvin Sinderbrand

[57] ABSTRACT

A scrambled television program that is received and recorded in a scrambled fashion includes program code and corresponding key codes for use in descrambling the recorded scrambled signal. The program codes and key codes are retained in a memory so that upon reproduction the key code can be read out of the memory and fed to a descramble pattern generator for descrambling the reproduced scrambled signal. By placing the program code and key code at the end of the scrambled program the scrambled signal cannot be descrambled until the entire program has been first received. By dividing the memory into permanent and temporary memories and adding an identification code to the transmitted scrambled signal, which selects either the permanent or temporary memory, and counting the number of times that the temporary memory is read out there can be a limitation placed on the number of times that the scrambled program is reproduced and decoded for viewing. Once a selected number is reached the contents of the temporary memory are erased, thereby preventing descrambling of the reproduced signal.

16 Claims, 11 Drawing Figures

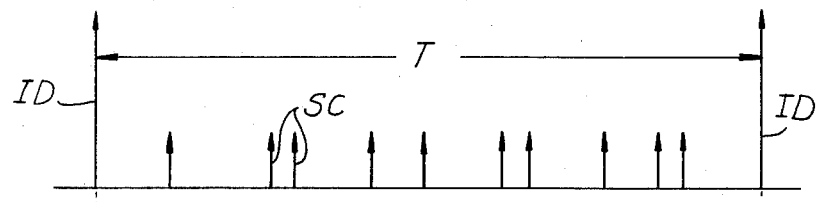
FIG. 1A
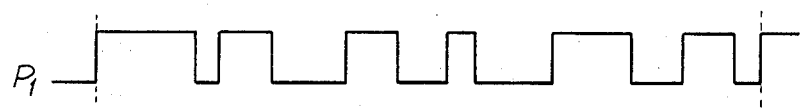
FIG. 1B
FIG. 1C
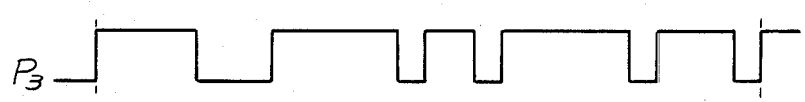
FIG. 1D
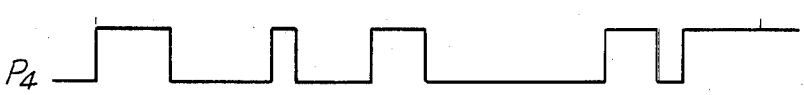
FIG. 1E
FIG. 2
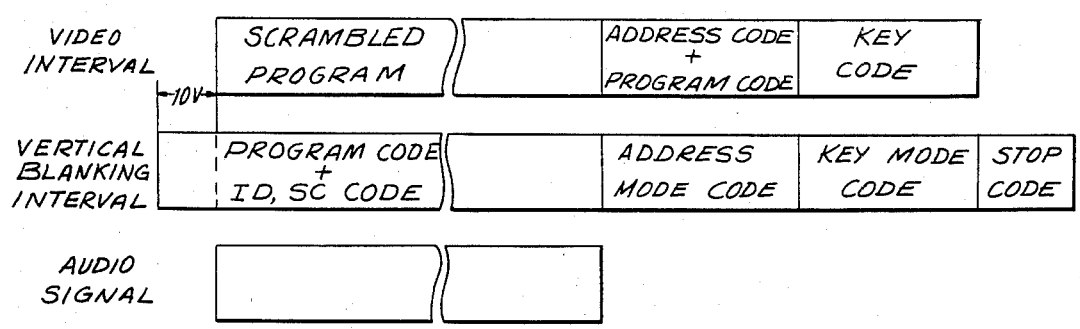

MEMORY SELECTING SYSTEM FOR SCRAMBLED TELEVISION RECEIVER

BACKGROUND OF THE INVENTION

1. Field of the Invention:

The invention relates generally to recording and reproducing scrambled television signals and, more specifically, relates to apparatus for storing descrambling codes to use in descrambling the recorded signals for subsequent playback in an unscrambled mode.

2. Description of the Prior Art:

Subscription television systems are well known in which a broadcasting station transmits a scrambled or coded television signal to the subscriber who has been provided with a decoder after making the appropriate financial arrangements with the broadcasting company. The decoder unscrambles or decodes the transmitted signals for viewing by the subscriber and, thus, unless the appropriate decoder is provided the video signals cannot be properly displayed. In most cases, the audio signals are also scrambled.

One proposed method for descrambling the signal in such a subscription television broadcasting system periodically inverts the polarity of the video signal for a predetermined period of time. Another example of a descrambling system periodically changes the order or sequence of the signal for a predetermined period of time. The corresponding code to correct the polarity or sequence of the signals is then contained in the decoder provided by the broadcasting company, so that the signals can be descrambled.

There are various other methods that can be used to scramble the signal, and in one kind a key code is broadcast along with the scrambled signal. This key code is based on the code used to scramble the signal originally and, thus, the subscriber can descramble the signal to obtain the appropriate audio and video signals.

Another system has been proposed in which a transmitted television signal is received and recorded directly in scrambled form by a video tape recorder (VTR) and, subsequently, the recorded and scrambled signal is played back through a decoder for viewing. Another feature of this proposed system, is that the scrambled signals are broadcast during off-peak hours, that is, at times other than the usual broadcast hours for prime-time programming, for example, after midnight.

One problem which has arisen in transmitting scrambled program signals and then descrambling them at the decoder is caused when distortion is introduced into the signal, either over the transmission path or upon receiving the signals at the receiver. The principal problem relates to the fact that during the step of reinverting the signals in polarity to decode them, if some distortion has been introduced there will be signal level differences at each of the polarity inversions and attendant waveform distortions will result. This produces a disconcerting visual flicker when the descrambled signals are displayed on a video monitor. The flicker is present at each point where the signal has been reinverted in polarity, and the flicker is particularly conspicuous when viewing still pictures, that is, when viewing one video frame. Moreover, such flicker is even more likely to be produced when the scrambled video signal has been recorded and played back by a video tape recorder, because such video tape recorders typically employ nonlinear DC circuits and nonlinear AC circuits, which emphasize the level differences and accentuate the flicker.

Another feature of the system of transmitting and recording scrambled broadcast signals at times other than prime viewing time is the ability to prevent viewing of the program on a real-time basis. This can be accomplished by providing the key signal, which is necessary for descrambling, at or near the end of the program. Therefore, the program must be completely received, or at least received in part, before it can be decoded for viewing, and this involves the memorization of the key code in a memory for subsequent read out into a decoder to descramble the signal.

Not only is the prevention of viewing programs in real-time a desirable feature but also the limitation on the number of times that a recorded program may be viewed is also desirable. That is, assuming that the scrambled signal has been recorded by the video tape recorder along with an appropriate key code, which has been stored in a suitable memory, the program then can be replayed an indefinite number of times, however, it is advantageous to those owning the rights to the program material to limit the number of times that a subscriber can decode the scrambled signal and, thus, the ability to limit the number of times that the program can be played back is an advantage.

OBJECTS AND SUMMARY OF THE INVENTION

Accordingly, it is an object of the present invention to provide apparatus for recording and reproducing a scrambled television signal that avoids the drawbacks inherent in the prior art.

It is another object of the present invention to provide a memory system for a decoder that stores the program code and key codes transmitted with a scrambled program signal and in which the scrambled program is recorded by a video tape recorder, and the reproduced signal is descrambled in a decoder using the stored code.

It is a further object of the present invention to provide a memory system for use in a decoder for storing program codes and key codes transmitted with scrambled program signals, in which the scrambled programs are first recorded in a video tape recorder and unscrambled in the decoder during reproduction, and in which the memory storing the program code and key code is limited in the number of times that it can be read out.

Other objects, features, and advantages of the present invention will become apparent from the following detailed description taken in conjunction with the accompanying drawings, throughout which like references designate the same elements and parts.

BRIEF DESCRIPTION OF THE DRAWINGS

FIGS. 1A–1E are timing charts useful in explaining the operation of the present invention;

FIG. 2 is a representation of timing intervals showing the manner in which information is arranged according to the present invention;

DETAILED DESCRIPTION OF PREFERRED EMBODIMENTS

Figure 3:
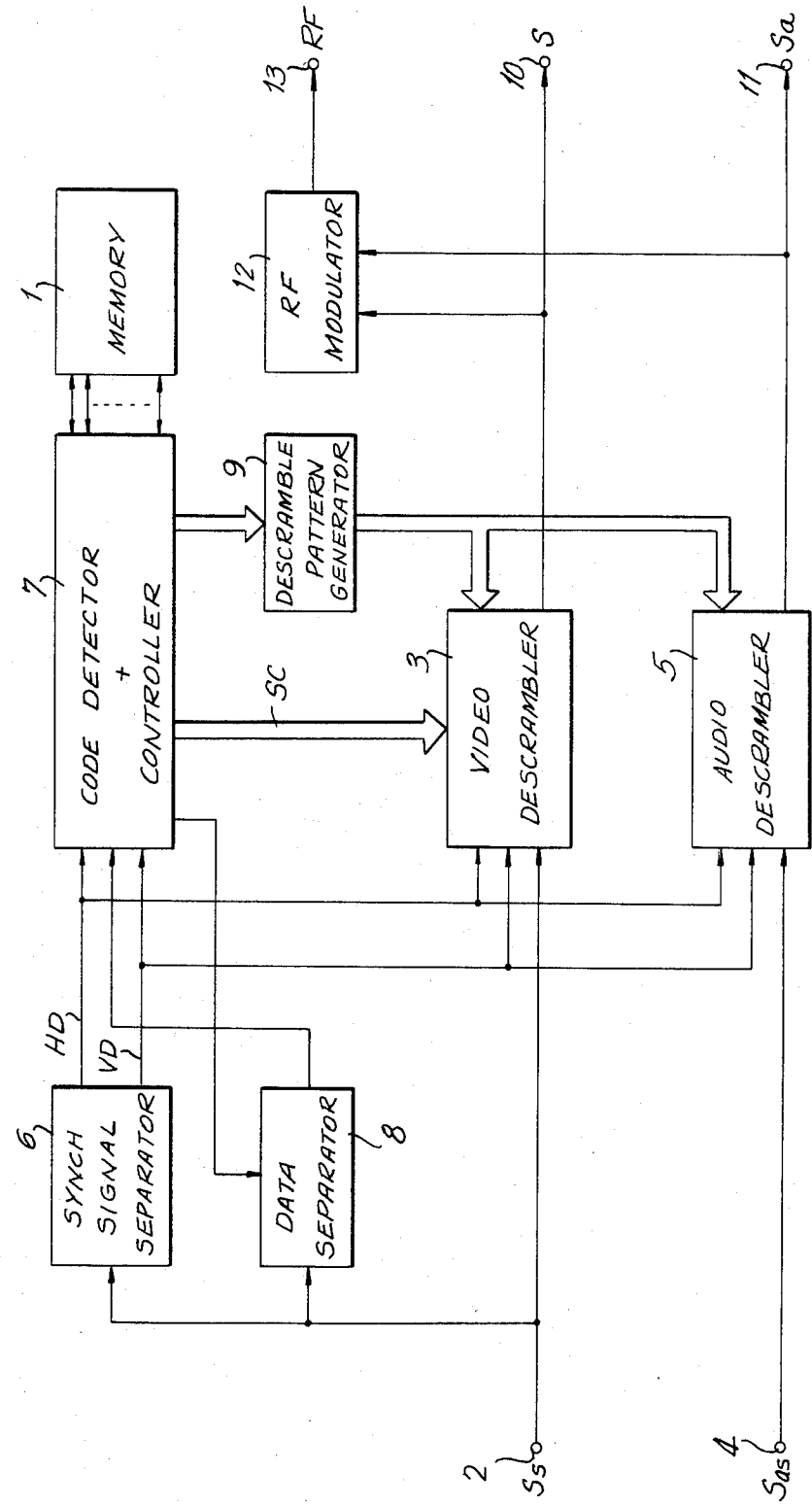
FIG. 3 is a schematic block diagram of a decoding system for decoding signals such as represented in FIG. 2.

The foremost objective in broadcasting scrambled television signals is to prevent unauthorized viewing of the program material and, thereby, to prevent nonsubscribers from obtaining the benefit and enjoyment of scrambled television programs without paying the appropriate fees. One proposed method to code and scramble the video signals is to periodically invert the polarity of the video signal every predetermined number of fields. By knowing the periodicity of the polarity inversion, descrambling or decoding is simplified. Nevertheless, one problem with this method is that if there is some distortion during transmission or reception then the decoding or descrambling produces a distorted waveform. This is principally based upon the fact that the distortion affects the signal level, and when reinverting a signal level difference between the respective signals is produced. Then, during viewing on a video monitor, this signal level difference results in a disconcerting visual flicker at each signal inversion. This flicker is particularly conspicuous when a single video frame or still image is being displayed. Additionally, this flicker problem is exacerbated by a video tape recorder, which contains nonlinear DC circuits and nonlinear AC circuits that accentuate the flicker.

The scrambling method or coding method taught by the present invention eliminates this flicker problem. Referring to FIG. 1A, a period T of arbitrary length, for example, 60 seconds, is determined and marked off by adding periodic index signals ID to a television signal that comprises the special program to be broadcast in scrambled form. The periodic index signals ID are represented in FIG. 1A by the taller arrows therein. Also added to the video signal are scene change signals SC, which are based upon changes in scene brightness, as might be detected from the luminance signal, for example. The scene change signals SC are represented in FIG. IA by the shorter vertical arrows therein. Also added to the television signal being broadcast is a key signal $P_1$ that has the period T determined by the index signals ID, and the waveform of key signal $P_1$ is represented in FIG. 1B. The key signal $P_1$ has an arbitrary pattern in which the only requirement is that the rising and falling edges of the rectangular waveform of the key signal $P_1$ of FIG. 1B must be synchronized with the field periods of the video signal (not shown). This key signal $P_1$ can be changed from time to time to prevent unauthorized descrambling, provided that the field synchronism requirement is met.

By using the scene change signals SC, the periodic index signal ID, and the key signal $P_1$ in various logic circuit combinations, a number of different scramble patterns can be formed. Exemplary of such scramble patterns are $P_2$, $P_3$, and $P_4$ shown, respectively, in FIGS. 1C, 1D, and 1E. Thus, one of these scramble patterns is used to control the polarity inversion of the video signal that is transmitted and is also used to decode the scrambled signal at the receiver for subsequent playback. In this embodiment, the polarity of the video signal is inverted each time a scramble pattern signal $P_2$, $P_3$, or $P_4$ has a high level.

More specifically, scramble pattern $P_2$ of FIG. 1C is formed by performing a logical AND operation between scene change signals SC and key signal $P_1$ and then inverting the output obtained from the logical AND operation. The waveform of scramble pattern $P_3$ shown in FIG. 1D is generated by having the signal level raised at each occurrence of the scene change signal SC or at each occurrence of the index signal ID, with the signal level being lowered at each leading or negative going edge of key signal $P_1$. Scramble pattern $P_4$ of FIG. 1E is generated by having its signal level raised by a logical AND operation between the scene change signal SC and key signal $P_1$ or a logical AND operation between index signal ID and key signal $P_1$, with the output from such logical AND operation being lowered, that is, going to zero, at each independent occurrence of the scene change signal SC. There are numerous other scramble patterns that can be easily formed by combining the scene change signal SC, the index signal ID, and the key signal $P_1$ in various logic circuit combinations, however, in using scrambling patterns $P_2$, $P_3$, and $P_4$, according to the present invention, there is no flicker produced in the visual display on the video monitor, because the polarity of the signal is inverted only in sychronism with the changes of scene brightness and, thus, flicker caused by polarity inversion in the descrambling operation is not detectable by the eye. Moreover, the ability to easily create a great number of scramble patterns makes it unlikely that a nonsubscriber could successfully decode the scrambled signal without having the authorized decoder.

One format for a scrambled television signal suitable for use with the present invention is shown in FIG. 2, in which the scrambled program, the address code (both special and regular, as will be explained hereinafter), the program code, and the key code can be broadcast in that order during the video interval. The program code, the index signal code, and the scene change signal code, an address mode code, key mode code, and a stop signal can be broadcast in that order during selected ones of the vertical blanking intervals of the video signal. The audio portion of the transmitted signal is a completely scrambled signal and it can be scrambled according to any advantageous pattern, including the above-described previously known patterns, since flicker is not a problem in the audio signal. The address code located in the video interval is the coded signal corresponding to a number previously assigned to the particular subscriber, that is, it is an individualized subscriber's address, and this address code has a regular mode and a special mode. In the regular mode, the transmitting station broadcasts the number codes of the subscribers who have not paid the subscription fee, and when the decoder of such non-subscriber receives this coded signal the decoder will be locked out and descrambling made impossible. In the special mode, the number code of a special subscriber is sent when a special program scrambled signal is broadcast and, thus, only decoders which detect this number code can unscramble or decode this special coded program. The key code is the code, $P_1$ of FIG. 1B, for example, that was used in conjunction with the index signal and scene change signal to generate the scrambled pattern used to scramble the signal, and this key code is also used to descramble the signal.

In this embodiment, the key code is arranged at the very end of the video interval following the complete scrambled program and also following the address code and program code, so that the transmitted scrambled program signal can only be descrambled after the entire program has been received and recorded, for example, in a video tape recorder. The key code is retained in a memory and subsequently read out for descrambling the signal when it is reproduced at a later time. Accordingly, by placing the key code at the end of the video interval, the transmitted program cannot be viewed in real time but must be time shifted by use of the video tape recorder by at least the actual length of the program. The key code need not be located at the end of the video interval, and it can be located at the beginning or middle of the scrambled program, or it can be separated into two portions, with a portion at the beginning and a portion at the end, or it can be located at the beginning of the scrambled program but stored in a memory that is not available for read out until after a certain period of time has elapsed, for example, after the major portion of the scrambled program has already been received and recorded.

The program code is arranged after the scrambled program and before the key code and appoints or selects the key code in accordance with the program being transmitted. The key code can be changed yearly, monthly, weekly, daily, or on a program-to-program basis, whatever is necessary in order to prevent nonsubscribers from decoding and viewing transmitted scrambled programs without paying the appropriate fee. Thus, if a number of different programs have been recorded, or if there are several different recorded tapes, there will be many different key codes contained in the memory. The program code has a peculiar content according to that program, and the program code and key code are memorized in the memory in correspondence with each other, that is, they are stored as pairs. Accordingly, the appropriate key code is obtained from the memory by reproducing the program code when the program is to be played back for viewing after it has been recorded in scrambled form. A typical example of a program code might be the date of the broadcast or a specific program number assigned thereto.

The program code in addition to being located after the actual scrambled video program is also inserted in specific ones of the vertical blanking periods or vertical blanking intervals of the scrambled signal, along with the index signal code ID and the scene change signal code SC. The address mode code follows the program code and ID and SC codes in the vertical blanking interval and indicates that the address code is being broadcast. The key mode code indicates that the key code is being broadcast and the stop code indicates that the scrambled broadcast has ended. All of the above codes are nonreturn-to-zero (NRZ) modulated binary signals, each having a predetermined number of bits, though all of the codes need not be the same length. In this embodiment, each of the codes that is inserted in the vertical blanking periods is inserted at the fourteenth and fifteenth horizontal scanning periods of the video field.

Additionally, the program code is inserted at the appropriate scan periods in the vertical blanking intervals for ten video fields before the scrambled program starts and is also inserted in the video information period after the scrambled program has finished, that is, after it has been completely recorded by the video tape recorder. This program code is found in each of the ten fields preceding the actual scrambled program at the appropriate horizontal scans, and in this embodiment the program code is located at the fourteenth and fifteenth horizontal scanning periods and is used to start the recording of the scrambled signal. At the receiver side of the above-described scrambled broadcast, the index signals, the scene change signals, and the key code are all detected so that the appropriate scramble pattern can be produced. Based on this generated scramble pattern, the polarity of the transmitted scrambled signal that has been recorded is inverted appropriately and the signal is effectively descrambled for viewing. That is, at the receiver side of the above-mentioned scrambled broadcast, the index signal ID, the scene change signal SC, and the key code $P_1$ are detected and the scramble pattern ($P_2$, $P_3$, or $P_4$) generated to unscramble the signal.

A decoder suitable for use with a tuner and video tape recorder for decoding such scrambled program is shown in FIG. 3. This decoder is intended to be connected between the video tape recorder, which might include its own internal tuner, and a television receiver or video monitor, (not shown). When a scrambled video signal is recorded in the video tape recorder, the program code and the key code are memorized in a nonvolatile memory 1, and these two codes are recorded in correspondence with each other. The operation of memory 1 in accordance with the present invention will be set forth in detail hereinafter.

When the video tape recorder is operated to reproduce the recorded scrambled signal, such recorded scrambled signal $S_s$ from the video tape recorder is fed in through terminal 2 to video descrambler 3, and the reproduced scrambled audio signal $S_{as}$ is fed in through terminal 4 to audio descrambler 5. A synchronization signal separator circuit 6 has its input connected to input terminal 2 to receive the scrambled video signal and separates the horizontal and vertical synchronizing signals HD and VD, respectively, from the scrambled video signal $S_s$. These horizontal and vertical sync signals are fed to synchronize code detector and controller 7 and are also fed to synchronize video descrambler 3 and audio descrambler 5. Scrambled input signals $S_s$ at terminal 2 are also fed to data separating circuit 8, which separates each code from the video signal $S_s$ and feeds such codes to code detector and controller 7, which detects the index code ID, the scene change code SC, and the program code reads out a key code from memory 1 in accordance with the detected program code detected, and then provides these signals to descramble pattern generator 9.

Descramble pattern generator 9 reforms the original scramble pattern ($P_2$, $P_3$, or $P_4$) according to the particular key code and feeds it to video descrambler 3 and audio descrambler 5, respectively. Video descrambler 3 then reinverts the polarity of the video signal $S_s$ according to the scramble pattern generated by descramble pattern generator 9 and supplies the original video signal S to output terminal 10. Audio descrambler 5 decodes and converts scrambled audio signal $S_{as}$ to the original sound signal $S_a$ and supplies it to output terminal 11. Output terminals 10 and 11 that have thereat video signal S and audio signal $S_a$, respectively, are connected to the line-in inputs of a television receiver or video monitor (not shown). Additionally, these output signals S and $S_a$, respectively, can be converted in frequency to that of a vacant or unused local television channel (usually channel 2 or 3) by an RF modular 12, and the frequency-shifted signals are fed to output terminal 13, which may be connected to the antenna input terminal of the television receiver (not shown).

Figure 4:
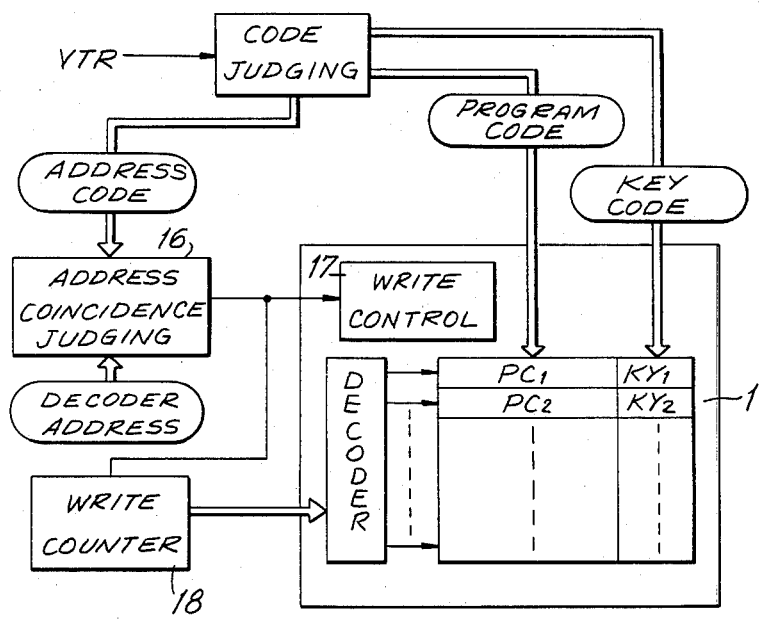
FIG. 4 is a schematic block diagram of a memory system for use in a decoder according to an embodiment of the present invention.
Figure 5:
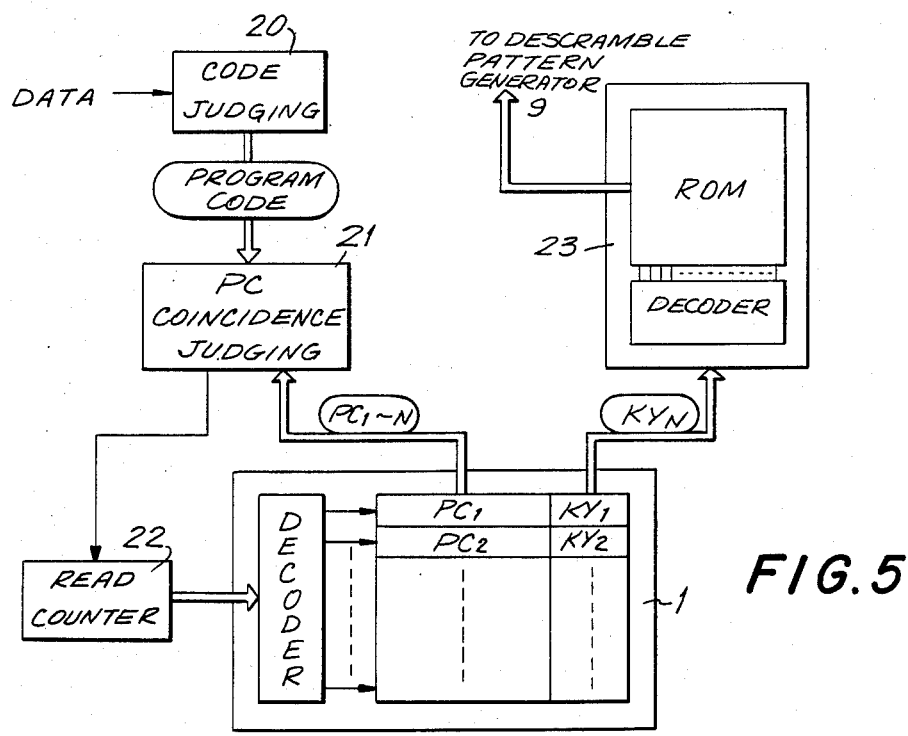
FIG. 5 is a schematic block diagram of a memory system for use in a decoder according to another embodiment of the present invention.

The operation and internal structure of code detector and controller 7 and of memory 1 are shown in more detail in FIGS. 4 and 5 and, specifically, FIG. 4 is directed toward operation of the memory 1 in the recording mode and FIG. 5 is directed toward operation of memory 1 in the reproducing mode. The scrambled signal that had been recorded in the video tape recorder is reproduced and fed to code judging circuit 15 that detects the address code and the address mode code from such signal. When the video tape recorder is recording, the tape recorder is set at the electric-electric (E-E) mode in which the video signal is output without passing through the recording circuit and a signal for a video monitor can be supplied directly.

In the case of the regular mode, the code detector and controller 7 is formed having address coincidence judging circuit 16 that is connected to writing control unit 17 and to writing counter 18 and which operates to stop writing control circuit 17 and writing control counter 18 if the decoder address, which corresponds to the particular non-subscriber's number, is in the address code in the scrambled signal. In such case, therefore, the key code is not memorized in memory 1, thereby preventing subsequent decoding of the signal. When there is no decoder address in the address code, the program code and the corresponding key code are memorized in memory 1. Accordingly, when a number of programs are recorded, program codes $PC_1$, $PC_2$ ... $PC_n$ and corresponding key codes $KY_1$, $KY_2$, ... $KY_n$ are memorized, respectively, in that order.

In the case of the special mode, the program codes and key codes are memorized in memory 1 only when there has been a decoder address in the address code. It should be noted that program codes $PC_1$, $PC_2$, ... $PC_n$ need not always correspond with key codes $KY_1$, $KY_2$, ... $KY_n$ and the same key code could be used for different programs and be appropriately identified by the particular program code.

In FIG. 5, when the signal recorded in the video tape recorder is reproduced, it is fed to code judging circuit 20 that detects the program code from the reproduced signal and feeds it to program code coincidence judging circuit 21, which determines if a match is present, and produces a signal to read in counter 22 that reads out the program codes $PC_1$, $PC_2$... $PC_n$ from memory 1 in that order and feeds them all to PC coincidence judging circuit 21. When the reproduced program code and the read out program code coincide, the corresponding key code is read out of memory 1 and fed to read only memory (ROM) 23. In read only memory 23, data corresponding to a number of descramble patterns is contained, for example, there may be up to thirty different patterns, and the data of the pattern that corresponds to the key code is then read out. This data is supplied to a descramble pattern generator for generating the appropriate descramble pattern. The embodiments described above relate to a scramble method in which the polarity of the signal is inverted, however, other scramble methods can be applied following the teaching of the present invention.

Thus, a suitable decoder is provided that can receive information contained within the scrambled signal and produce a descramble signal used to descramble the recorded program. The present invention goes further, however, and teaches the use of memories that are divided into a temporary memorizing mode and a permanent memorizing mode. More specifically, in the temporary memorizing mode, which may employ a nonvolatile memory, the memorized program codes PC and key codes KY are counted and erased after they have been read out a predetermined number of times. Accordingly, the number of reproductions of the tape in this mode is limited. Once the memory has been erased then it is impossible to view the recorded signals, since they are recorded in scrambled form and cannot be decoded because the memory containing the key code has now been erased. In the permanent memory mode, the program may be reproduced as many times as desired in accordance with the number of times the codes are read out from the memory. In such case, a nonvolatile memory could also be advantageously used.

Additionally, the temporary memory mode is also divided into a general mode and a special mode, so that in the general mode an ordinary scrambled program is recorded and the codes are memorized temporarily. This general mode can be subsequently transferred to the permanent memory mode. A special mode is one in which the special program of a scrambled broadcast is received and the codes are memorized only temporarily. This mode cannot be transferred into the permanent memory mode.

In order to distinguish the above general mode and the special mode, an identification bit is included in the signal, for example, an extra bit can be added to the address code, as represented in FIG. 2.

Figure 6:
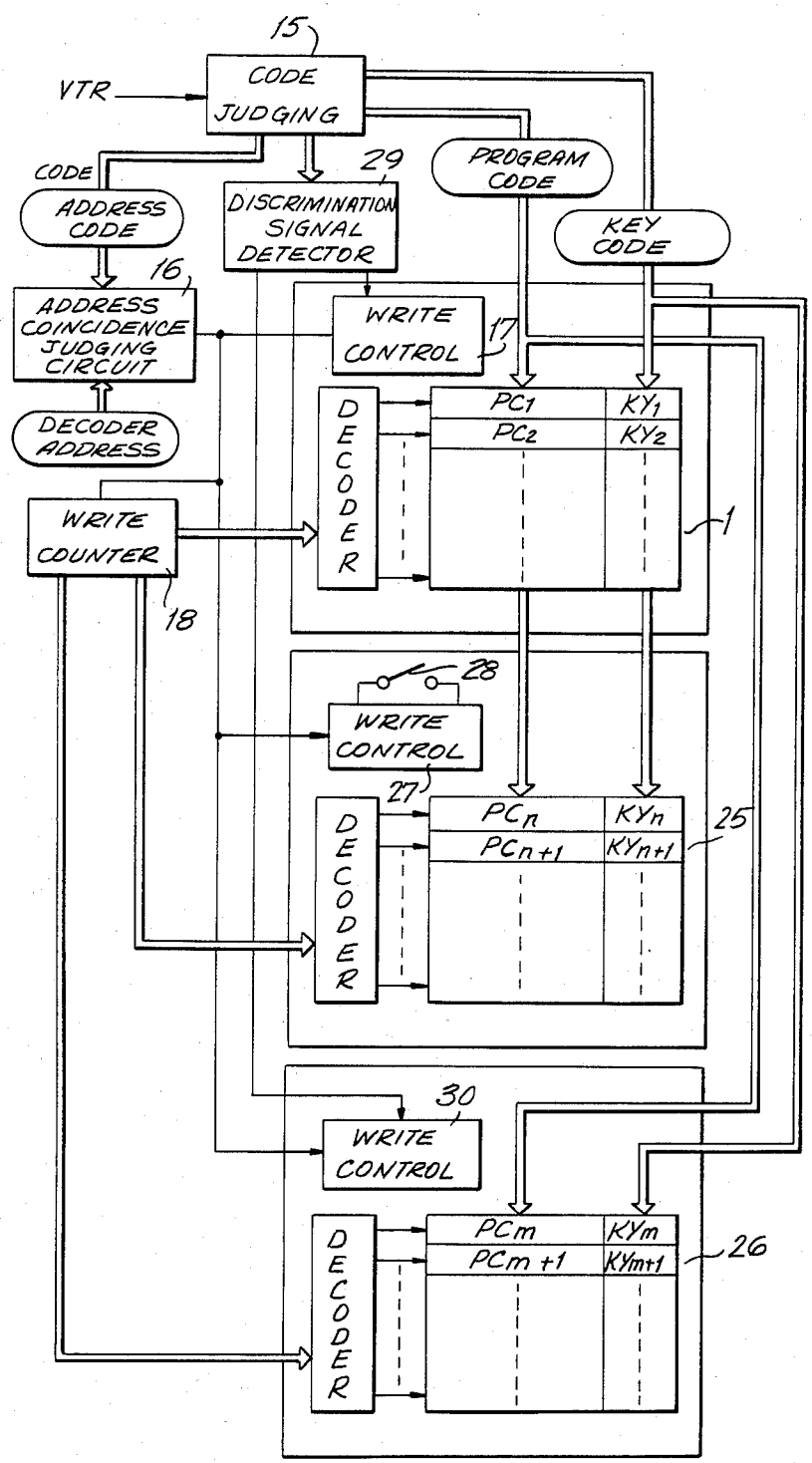
FIG. 6 is a schematic block diagram of another embodiment of a memory system for use in a decoder according to the present invention.
Figure 7:
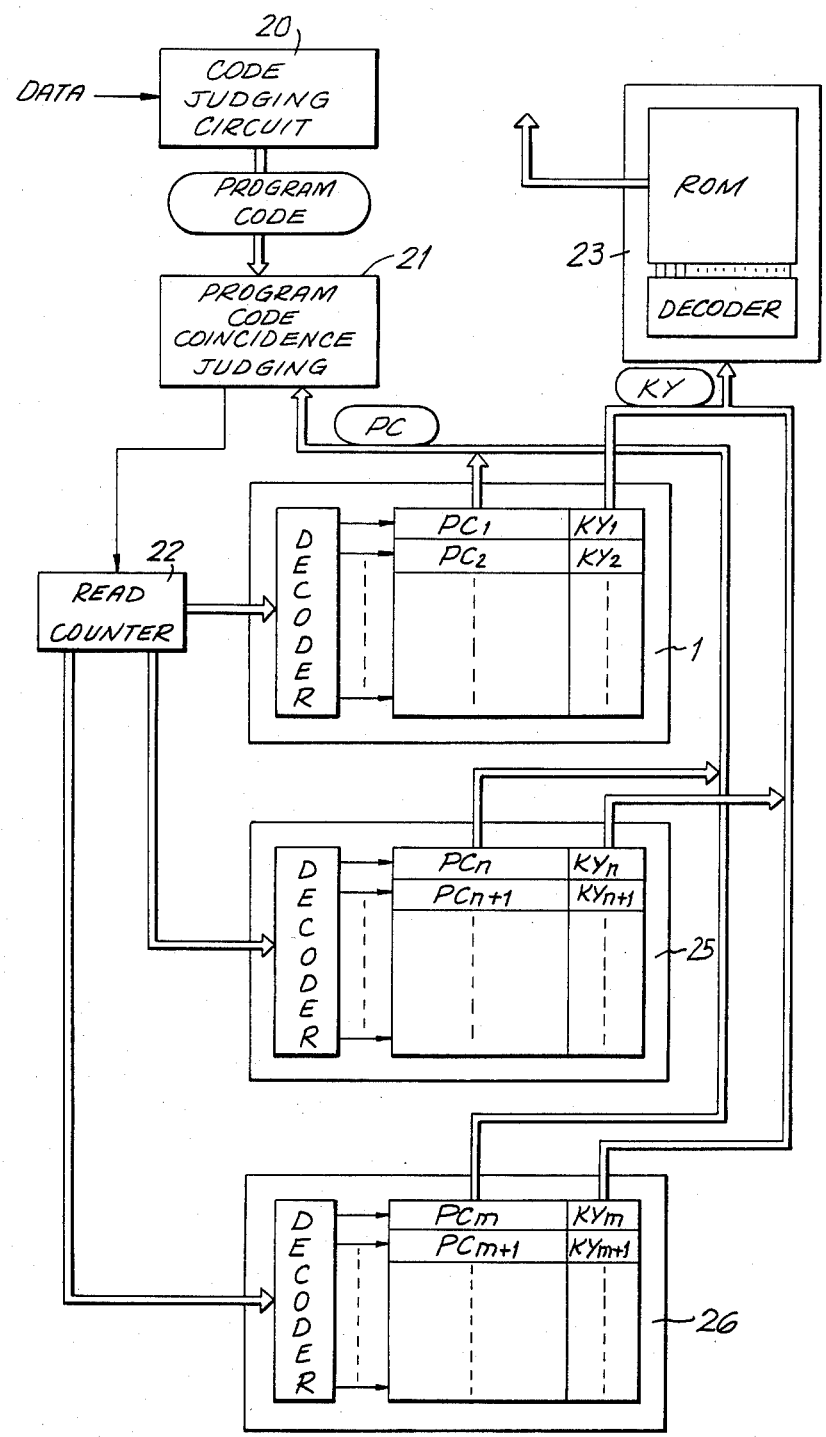
FIG. 7 is a schematic block diagram of another embodiment of a memory system for use in a decoder according to the present invention.

Additionally, in addition to memory 1 of the decoder of FIG. 3 different memory configuration can be employed, such as represented in FIGS. 6 and 7, respectively, which are provided for memorizing the general mode, the special mode, and the permanent memory mode. More specifically, memory 1 is utilized in the general mode, memory 25 is used in the permanent memory mode, and memory 26 is used in the special mode relating to the temporary memory mode.

Memories 1 and 26 are used in the above-described first mode in which code data is memorized temporarily and an advantageous method using such temporary data storage can consist of the following steps. (1) Providing the capacities of memories 1 and 26 sufficiently great to memorize fifteen to twenty each of the program codes PC and key codes KY and being arranged to erase the oldest data and memorize new data once capacity has been reached. (2) Providing an additional memory for each of memories 1 and 26, respectively, in which all program codes PC of programs that have been recorded up to that time are retained so that a history of memories 1 and 26 can be produced. Once such history is made, causing memories 1 and 26 to be inhibited so as not to memorize the data, which had been erased from memories 1 and 26, again when the program is reproduced. (3) Adding a signal that determines the number of times that the recorded program can be reproduced and descrambled, such signal being added, for example, to the program code PC and then memorizing this added signal along with the program code PC and key codes KY correspondingly in memories 1 and 26. Then, erasing the data of a program code and a key code after the program has been reproduced such predetermined number of times. (4) Adding a signal that determines the number of permissable reproductions of one program in the decoder. (5) Erasing the data of the program codes PC and key codes KY after a predetermined time period has elapsed. This is realized, for example, by comparing the year, month, and day contained in a program code with the content of a timer provided at the receiver. (6) Broadcasting scrambled programs in the order of their program numbers, and then comparing the number of the program with the number of the newest program in memories 1 and 26 and then recording only that program having a number higher than the newest or most recent program.

Referring now to FIG. 6, a decoder for use in the recording mode is shown in which the operation is the same as that of the embodiment of FIG. 4, except that the extra memories 25 and 26 are provided, as are writing controllers 28 and 30, respectively, and identification signal detecting circuit 29 that detects the first-mentioned identification signal provided in the address code to distinguish the general mode and the special mode in the temporary memory mode. When a regular program is received and fed through the VTR, identification signal detecting circuit 29 detects that this is the case by judging the identification signal in the address code of the program. At the same time, address coincidence judging circuit 16 compares the address code, which is being received, with the decoder address and if the address code and decoder address do not coincide, writing control 17 is started and the program code and the key code are supplied from code detector 15 and memorized in memory 1.

When a special program has been received and is now being reproduced from the video tape recorder, identification signal detecting circuit 29 detects that a special program is being received by examining the identification signal in the address code of the program and, at the same time, address coincidence judging circuit 16 compares the address code that is in the signal being received with the decoder address. If the address code and the decoder address coincide with each other, writing control circuit 30 is activated and the program code and key codes are memorized in memory 26. The data in memory 1, intended for use in the general mode, can be transferred to the memory 25 for use in the permanent memory mode, and switch 28 is provided in conjunction with writing control 27, which forms part of a memory 25, and by actuating switch 28 data in memory 1 may be transferred to a memory 25. By transferring the data of the program codes and key codes, the programs which have these codes can be reproduced as many times as possible, that is, there is no limitation on the number of times that the program may be reproduced. Memory 25 can contain, for example, one-hundred-sixty different program codes PC and key codes KY.

Referring to FIG. 7, the invention is represented in the reproducing mode and the operation thereof is substantially identical to that of the embodiment of FIG. 5, except that additional memories 25 and 26 are provided. The program code identification judging circuit 21 receives the input data from code judging circuit 20 and locates the identical program data of the reproduced program from either memory 1, memory 25, or memory 26 and, when the same program is detected, the corresponding key code is supplied to read only memory 23 and the corresponding data is then supplied to the descramble pattern generating circuit. Thus, the scrambled program is unscrambled in the decoder.

Although illustrative embodiments of the present invention have been described in detail above with reference to the accompanying drawings, it is to be understood that the invention is not limited to those precise embodiments, and that various changes and modifications can be effected therein by one skilled in the art without departing from the scope or spirit of the invention, as defined by the appended claims.

What is claimed is:

1. Apparatus for descrambling transmitted scrambled signals that are to be recorded and reproduced and which include a scrambled video signal, a descrambling key code signal, a program code signal corresponding to the descrambling key signal, and an identification signal, the apparatus comprising:

memory means including permanent memory means for permanently memorizing said program codes and said corresponding key codes and temporary memory means for temporarily memorizing said program codes and corresponding key codes when the transmitted scrambled signals are recorded;

means for detecting said identification signal in said transmitted scrambled signals for selecting either said temporary memory means or said permanent memory means for memorizing said program codes and corresponding key codes therein;

means for comparing a program code contained in said memory means and a program code from said scrambled transmitted signals when the recorded scrambled signals are reproduced to determine a coincidence therebetween;

means responsive to said means for comparing for selecting a corresponding key code from said memory means;

descrambling pattern generator means receiving said corresponding key code for producing a descrambling pattern signal; and descrambling means receiving said descrambling pattern signal and said reproduced scrambled signal for descrambling said scrambled video signal in accordance with said descrambling pattern signal.

2. Apparatus for descrambling transmitted scrambled signals according to claim 1, further comprising memory control means connected to said temporary memory means and said permanent memory means for causing the contents of said temporary memory means to be transferred to said permanent memory means for retention therein.

3. Apparatus for descrambling transmitted scrambled signals according to claim 1, further comprising read only memory means containing a plurality of scramble patterns and being connected to receive said key code from said memory means for producing a corresponding scramble pattern fed to said descrambling pattern generator.

4. Apparatus for descrambling transmitted scrambled signals according to claim 1, in which said means for descrambling said reproduced scrambled signals includes a video descrambler means responsive to said descramble pattern from said descramble pattern generator means and for producing a descrambled video signal for visual display.

5. Apparatus for descrambling transmitted scrambled signals according to claim 4, in which said scrambled video signal is scrambled by periodic polarity inversions thereof and said descrambling means includes means for inverting the polarity of said scrambled signal in response to said descrambling pattern signal.

6. Apparatus for descrambling transmitted scrambled signals that are to be recorded and reproduced and which include a scrambled video signal, a descrambling key code signal, a program code signal corresponding to the descrambling key signal, and an identification signal, the apparatus comprising:

memory means including first and second temporary memory means for selectively memorizing therein corresponding program codes and key codes, means for detecting said identification signal and, in accordance therewith, selecting either said first or second temporary memory means for memorizing said program codes and corresponding key codes therein, and permanent memory means connected only to said first temporary memory means for permanently memorizing the contents thereof;

means for comparing a program code contained in said memory means and a program code from said scrambled transmitted signals when the recorded scrambled signals are reproduced to determine a coincidence therebetween;

means responsive to said maans for comparing for selecting a corresponding key code from said memory means;

descrambling pattern generator means receiving said corresponding key code for producing a descrambling pattern signal; and descrambling means receiving said descrambling pattern signal and said reproduced scrambled signal for descrambling said scrambled video signal in accordance with said descrambling pattern signal.

7. A method for descrambling transmitted scrambled signal of the kind which include a scrambled video signal, a descrambling key signal, a program code signal corresponding to the descrambling key signal, and an indentification signal, the method comprising the steps of:

recording said transmitted scrambled signals;

memorizing said program codes and corresponding key codes when said transmitted scrambled signals are recorded by providing a temporary memory for temporarily memorizing the program codes and corresponding key codes, providing a permanent memory for permanently memorizing said program codes and corresponding key codes, detecting said identification signal, and selecting either the temporary memory or the permanent memory for retention of said program codes and corresponding key codes in response to detecting the identification signal in said transmitted scrambled signals;

reproducing said recorded scrambled signals;

comparing said memorized program codes and a program code of said scrambled signal being reproduced and choosing a corresponding one of said memorized program codes;

determining a key code corresponding to said chosen program code;

reading out said corresponding key code from said memory to a pattern generator;

generating a descrambling pattern by said pattern generator from said corresponding key code; and descrambling said reproduced scrambled signal using said descrambling pattern.

8. A method for descrambling transmitted scrambled signals according to claim 7, in which after the program codes and the corresponding key codes are memorized in the temporary memory, there is effected the further step of transferring the contents of the temporary memory to the permanent memory for permanent retention therein.

9. A method for descrambling transmitted scrambled signals according to claim 7, in which said scrambled signals further include a coded audio signal and further comprising the step of generating an audio decode pattern and decoding said audio signal for reproduction.

10. A method for descrambling transmitted scrambled signals according to claim 7, in which the scrambled video signal is scrambled by periodic polarity inversions thereof and said step of descrambling said video signal includes the step of inverting the polarity of said scrambled signal in response to said descrambling pattern.

11. Apparatus for descrambling signals transmitted in scrambled form that are to be recorded and reproduced and which include a scrambled television program, an identification code, a program code, and a descrambling key signal corresponding to the program code, the apparatus comprising:

temporary memory means for temporarily memorizing program codes and corresponding key codes when the scrambled transmitted signals are recorded;

permanent memory means for permanently memorizing program codes and corresponding key codes when scrambled transmitted signals are recorded;

means for detecting the identification code in said transmitted signals and selecting either said temporary memory means or said permanent memory means, respectively, for memorizing said program codes and corresponding key codes in response thereto;

means for comparing program codes memorized in said temporary memory means or in said permanent memory means with the program code of the scrambled signals being reproduced and choosing the one of the memorized program codes coinciding with said program code of the scrambled signals being reproduced;

means for generating a descrambling pattern based upon the memorized descrambling key code that corresponds to said one program code which is chosen; and means for descrambling the reproduced scrambled signals in accordance with said descrambling pattern.

12. Apparatus for descrambling transmitted scrambled signals according to claim 11, further comprising means for transferring contents of said temporary memory means to said permanent memory means for permanent retention therein.

13. Apparatus for descrambling transmitted scrambled signals according to claim 11, in which the program codes and corresponding key codes are memorized in said temporary memory means, and further comprising counter means for counting the number of times said key code is read out of said temporary memory means, and erase means for erasing the content of said temporary memory means upon said counter means reaching a predetermined number.

14. Apparatus for descrambling transmitted scrambled signals according to claim 11, in which said means for generating a descrambling pattern includes a read only memory means containing a plurality of scramble patterns and being connected to receive said descrambling key signal from said temporary memory means or from said permanent memory means for providing a corresponding scramble pattern signals.

15. Apparatus for descrambling a transmitted coded signal according to claim 11, in which said scrambled television program includes a coded audio signal, and further comprising means for generating an audio decode pattern and means for decoding said audio signal for reproduction.

16. Apparatus for descrambling transmitted scrambled signals according to claim 11, in which said scrambled television program is scrambled by periodic polarity inversions thereof and said means for descrambling comprises means for inverting the polarity of said scrambled signal in accordance with said descrambling pattern.

* * * * *